(12) United States Patent
Loop et al.

(10) Patent No.: US 8,854,365 B2
(45) Date of Patent: Oct. 7, 2014

(54) RENDERING PARAMETRIC SURFACE PATCHES

(75) Inventors: Charles Teorell Loop, Mercer Island, WA (US); Christian Eisenacher, Ebelsbach (DE)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 12/687,895

(22) Filed: Jan. 15, 2010

(65) Prior Publication Data

US 2011/0175911 A1 Jul. 21, 2011

(51) Int. Cl.
*G06T 15/00* (2011.01)
*G06T 17/30* (2006.01)

(52) U.S. Cl.
CPC .............. *G06T 15/005* (2013.01); *G06T 17/30* (2013.01)
USPC ........... 345/423; 345/419; 345/428; 345/505; 345/614

(58) Field of Classification Search
CPC ............................. G06T 17/30; G06T 15/005
USPC ........................ 345/419, 423, 428, 505, 614
See application file for complete search history.

(56) References Cited

U.S. PATENT DOCUMENTS

| | | | |
|---|---|---|---|
| 6,483,518 B1 * | 11/2002 | Perry et al. | 345/590 |
| 6,603,484 B1 * | 8/2003 | Frisken et al. | 345/622 |
| 6,707,452 B1 | 3/2004 | Veach | |
| 7,170,515 B1 | 1/2007 | Zhu | |
| 7,920,139 B2 * | 4/2011 | Nystad et al. | 345/419 |
| 8,044,971 B2 * | 10/2011 | Nystad | 345/614 |
| 8,125,487 B2 * | 2/2012 | Bakalash et al. | 345/505 |
| 8,384,715 B2 * | 2/2013 | Loop et al. | 345/420 |
| 2003/0160798 A1 | 8/2003 | Buehler | |
| 2008/0049018 A1 | 2/2008 | Sfarti | |

OTHER PUBLICATIONS

Rockwood et al, Real-Time Rendering of Trimmed Surfaces, ACM Computer graphics, Jul. 1989, pp. 107-116.*
Zhou, et al., "RenderAnts: Interactive REYES Rendering on GPUs", Retrieved at<<http://www.kunzhou.net/2009/renderants-tr.pdf>>, Dec. 1, 2009, pp. 1-14.
Dyken, et al., "Semi-uniform Adaptive Patch Tessellation", Retrieved at<<http://smartpipe.com/project/Heterogeneous%20Computing/preprints/topofix-draft.pdf>>, Aug. 4, 2008, pp. 1-9.
McAllister, et al. , "Real-Time Rendering of Real World Environments",Retrieved at<<http://www.cs.purdue.edu/cgvlab/papers/popescu/popescuLRRRRWEEGSR99.pdf>>, To appear in Rendering Techniques '99, Proc. of Eurographics Workshop on Rendering, 1999, pp. 1-17.

(Continued)

*Primary Examiner* — Phu K Nguyen
(74) *Attorney, Agent, or Firm* — Cassandra Swain; Judy Yee; Micky Minhas (57) ABSTRACT

A method for rendering parametric surface patches on a display screen includes receiving, at a processing unit, a computer-implemented representation of a first parametric surface patch, wherein the first parametric surface patch is a portion of a three-dimensional computer-implemented model that is desirably displayed at a first viewing perspective on the display screen. The first parametric patch is subdivided in the parameter domain to generate a plurality of subpatches, which are stored as quadtree coordinates in a memory. Thereafter, at least one pixel on the display screen is rendered based at least in part upon the quadtree coordinates in the memory.

20 Claims, 9 Drawing Sheets

(56) References Cited

OTHER PUBLICATIONS

Halle, Michael W., "Multiple Viewpoint Rendering for Three-Dimensional Displays", Retreived at<<http://www.media.mit.edu/spi/SPIPapers/halazar/thesis-orig.pdf>>, Jun. 1997, pp. 1-164.

Cook, et al., "The Reyes Image Rendering Architecture", Retreived at<<http://delivery.acm.org/10.1145/40000/37414/p95-cook.pdf?key1=37414&key2=1627065521&coll=GUIDE&dl=GUIDE&CFID=57859501&CFTOKEN=81239306>>, Jul. 27-31, 1987, pp. 95-102.

Dachsbacher, et al., "Sequential Point Trees", Retreived at<<http://www.inf.ethz.ch/personal/giesen/tch/AGCGsem_SS05/dachsbacher.pdf>>, pp. 1-6, 2010.

Eisenacher, et al., "Real-Time View Dependent Rendering of Parametric Surfaces", Retreived at<<http://delivery.acm.org/10.1145/1510000/1507172/p137-eisenacher.pdfkey1=1507172&key2=7247065521&coll=GUIDE&dl=GUIDE&CFID=56611575& CFTOKEN=17080828>>, Feb. 27-Mar. 1, 2009, pp. 137-144.

"CUDPP: CUDA Data Parallel Primitives Library", Retreived at<<http://cudpp.googlecode.com/svn/trunk/cudpp/doc/CUDPP_slides.pdf>>, pp. 1-24, 2010.

Molnar et al., "A Sorting Classification of Parallel Rendering", Retreived at <<http://www.cs.virginia.edu/~gfx/Courses/2002/BigData/papers/Approaches%20to%20Parallelism/A%20Sorting%20Classification%20of%20Paralle% 20Rendering.pdf>>,vol. 14, Issue 4, Jul. 1994, pp. 23-32.

"NVIDIA CUDA: Compute Unified Device Architecture", Retreived at <<http://developer.download.nvidia.com/compute/cuda/2_0/docs/CudaReferenceManual_2.0.pdf>>, Jun. 2008, Version 2.0, pp. 1-247.

Owens, et al., "Comparing Reyes and OpenGL on a Stream Architecture", Retreived at<<http://www.cs.virginia.edu/~gfx/Courses/2002/BigData/papers/Stream%20Processing/Comparing%20Reyes%20and%20OpenGL%20on%20a%20Stream%20Architecture.pdf>>, 2002, pp. 1-10.

Patney, Anjul., "Real-Time REYES: Programmable Pipeline and Research Challenges", Retreived at <<http://idav.ucdavis.edu/~anjul/slides/reyescourse_SA.pdf>>, 2008, pp. 1-44.

Patney, et al., "Real-Time REYES-Style Adaptive Surface Subdivision", Retreived at<<http://www.idav.ucdavis.edu/func/return_pdf?pub_id=952>>, vol. 27, Issue 5, Dec. 3, 2008, pp. 1-8.

Pineda, Juan, "A Parallel Algorithm for Polygon Rasterization", Retreived at<<http://delivery.acm.org/10.1145/380000/378457/p17-pineda.pdf?key1=378457&key2=8337065521&coll=GUIDE&dl=GUIDE&CFID=56611391&CFTOKEN=67743930>>, Aug. 1-5, 1988, pp. 17-20.

Seiler, et al., "Larrabee: A Many-Core X86 Architecture for Visual Computing", Retreived at<<http://software.intel.com/file/18198/>>, vol. 27, No. 3, Article 18, Aug. 2008, pp. 1-16.

* cited by examiner

RENDERING PARAMETRIC SURFACE PATCHES

BACKGROUND

Conventionally, a collection of triangles is rasterized to cause a three-dimensional graphical object to be rendered on a display screen of a computing device. Specifically, a three-dimensional object rendered on the display screen can be represented as a collection of triangles, wherein density of the triangles can vary based upon an amount of detail that is desirably shown to a viewer. Generally, the density of the triangles must be high enough so as to allow the viewer to be able to ascertain the shape of the object. Each triangle may also be associated with data pertaining to texture that can indicate how an image is to be mapped to the triangle (to provide the triangle with some form of texture). Once the collection of triangles is assembled to represent the three-dimensional object, vertices of the triangles can be manipulated to cause the object to be displayed at a particular viewing perspective. For example, for each frame shown on the display screen, there is a camera position that defines the perspective of the three-dimensional object.

After the vertices of the triangle are placed in three-dimensional space in accordance with the camera position, the triangles are rasterized. That is, the triangles are mapped from three-dimensional space to the two-dimensional display screen through utilization of, for instance, a view perspective matrix. Values corresponding to the triangles are interpolated such that they correspond to certain pixels on the display screen. Thereafter, a pixel shader program can be utilized to assign colors to pixels, thereby rendering the three-dimensional object on the display screen.

The above-mentioned actions are typically undertaken by graphical processing units (GPUs), which have substantial parallel computing capabilities. To take advantage of such parallel computing capabilities, however, the triangles used to model three-dimensional objects must correspond to a certain number of pixels (10-20 pixels), as the hardware of GPUs can perform computation on the certain number of pixels simultaneously. If the number of pixels per triangle becomes too small, the parallel computing powers of the GPU are not sufficiently utilized in connection with rendering the three-dimensional object on a display screen.

SUMMARY

The following is a brief summary of subject matter that is described in greater detail herein. This summary is not intended to be limiting as to the scope of the claims.

Described herein are various technologies pertaining to rendering views of three-dimensional objects through utilization of computer-implemented view-projected parametric surface patches. Pursuant to an example, a view-projected parametric surface patch may be a bicubic surface patch generally, and may be a Bézier surface patch in particular. A three-dimensional graphical object can be represented through utilization of a plurality of conjoining parametric surface patches. Each of these parametric surface patches can be analyzed to determine whether the parametric surface patch is to be retained for rendering, culled (e.g., the parametric surface patch lies outside of the view of a user of a computing device or is entirely back-facing), or subdivided into a plurality of sub-patches.

For example, a size of the parametric surface patch can be compared with a threshold size, and if the size is larger than the threshold size the parametric surface patch can be subdivided into a plurality of sub-patches. In another example, "flatness" of the parametric surface patch can be compared with a threshold "flatness" metric, and if the parametric surface patch is not as flat as desired, such surface patch can be subdivided into a plurality of sub-patches. In still yet another example, the parametric surface patch can be analyzed to determine if such surface patch has a silhouette edge corresponding thereto. If the parametric surface patch has a silhouette edge corresponding thereto (unless the surface patch is sufficiently small), then the parametric surface patch can be subdivided into a plurality of sub-patches. If the parametric surface patch will not be displayed on the display screen (e.g., is entirely back-facing or lies outside the display window), then the parametric surface patch can be culled. If the parametric surface patch meets the metric for size, flatness, and/or silhouette edge, then parametric surface patch can be kept. Such process can repeat for every sub-patch.

To utilize the parallel computing prowess of graphical processing units (GPUs), subdivision of parametric surface patches can be undertaken in the parameter domain. That is, rather than retaining control points of the surface patches in memory, data indicating coordinates of a known portion of a sub-domain (e.g., a particular corner of the sub-domain) can be stored as well as length of the sub-domain. In an example, sub-patches can be stored as quadtree coordinates, wherein such quadtree coordinates include data indicating a parent parametric surface patch (referred to herein as a urPatch), values indicating a certain portion of a sub-domain (e.g., a corner), and a value indicating length of the sub-domain. When control points are desired for a certain sub-patch, such control points can be computed on the fly. The three-dimensional graphical object may be rendered based at least in part upon the stored quadtree coordinates.

Additionally described herein are technologies pertaining to assigning parametric surface patches (urPatches and/or sub-patches) to certain buckets. A computing display screen can be partitioned into a plurality of tiles of a particular size (e.g., 8×8 pixels). Each tile may correspond to a bucket. Size of parametric surface patches can be restricted to be no larger than size of a tile, such that a parametric surface patch can be assigned to no more than four buckets. The number of patches corresponding to each bucket may then be ascertained, and tiles can be rasterized based at least in part upon the assignment of parametric surface patches to buckets.

Also described herein are technologies pertaining to hiding cracks caused by subdivision of adjacent parametric surface patches to different granularities. For example, parametric surface patch boundaries can be adjusted to correspond with Bézier convex hulls to effectively hide cracks between adjacent parametric surface patches.

Other aspects will be appreciated upon reading and understanding the attached figures and description.

DETAILED DESCRIPTION

Various technologies pertaining to graphically rendering parametric surface patches such as bicubic surface patches will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
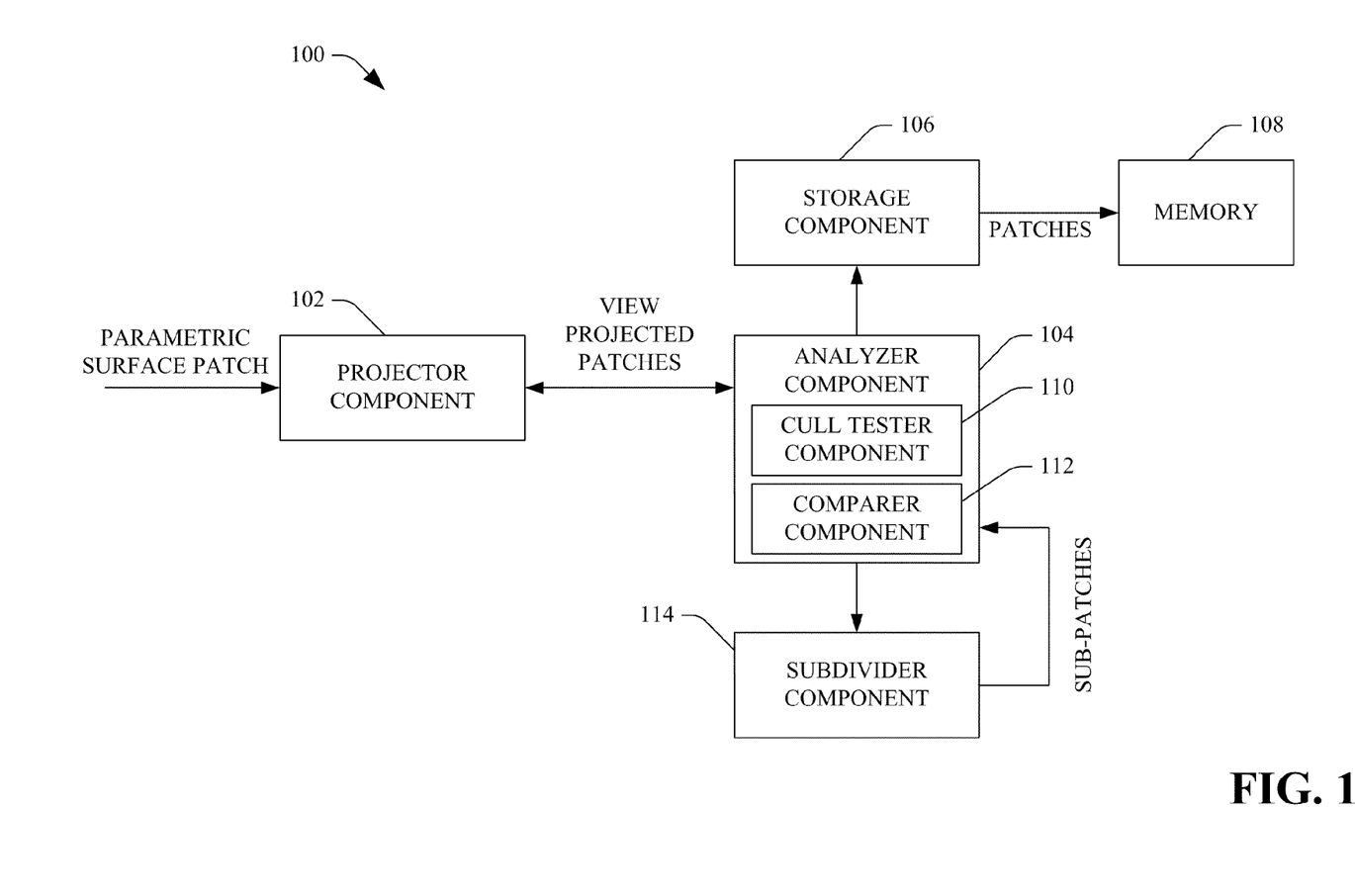
FIG. 1 is a functional block diagram of an example system that facilitates subdividing parametric surface patches in the parameter domain.

With reference to FIG. 1, an example system 100 that facilitates rendering parametric surface patches on a display screen is illustrated. The display screen may be a display screen of a computing device, a television, a portable media player, or the like. The system 100, for instance, can be comprised by a graphics card of a computing device. Thus, components of the system 100 may be portions of code executable by a graphical processing unit (GPU) on a graphics card. In another example, the system 100 may be included in a motherboard of a computing device such as a personal computing device. In yet another example, the system 100 may be included in a graphics card or motherboard of a gaming console, a portable computing device such as a mobile telephone, a mobile media player, etc.

The system 100 includes a projector component 102 that receives a plurality of parametric surface patches that describe a three-dimensional model. Specifically, the parametric surface patches, when conjoined, can represent a computer-implemented three-dimensional graphical model that is desirably displayed on a display screen. The parametric surface patches may be, in an example, bicubic surface patches such as Bézier surface patches. As appreciated in the art of computer graphics, bicubic Bézier patches are popular due to their expressive power (such as their ability to precisely represent surface shapes such as spheres, cones, tori, and the like) and their invariance under view projection mappings. A bicubic Bézier patch is a patch of a smooth continuous surface that includes sixteen original control points that are distributed in a grid arrangement along the surface, wherein such control points define the geometry of the surface. For example, each control point can be assigned some data that indicates the weight pertaining to the control point, which can describe contours of the surface represented by the bicubic Bézier patch. The original control points include four corner control points and twelve noncorner control points. Of course, other types of patches that can be utilized to represent a three-dimensional model can be utilized in the system 100 and are intended to fall under the scope of the hereto-appended claims. By way of example but not limitation, arbitrary bi-degree tensor product patches and polynomial patches with triangular domains can be employed as parametric surface patches.

The system 100 may be employed to cause a display screen to display a three-dimensional graphical model from a certain viewing perspective (a certain camera location). To undertake such view-dependent rendering, the projector component 102 can project the received parametric surface patches according to a desired view/camera location. For example, each of the parametric surface patches can be projected onto a scene through utilization of, for instance, a composite Model View Projection (MVP) matrix, thereby generating view-projected patches. Such view-projected patches can be placed in a queue where they are identified for culling, subdivision, or rendering. The initial view-projected patches that can identify or represent the three-dimensional object desirably rendered can be referred to herein as urPatches. As will be described in greater detail below, these urPatches can be stored in a separate buffer from subpatches which are generated as a result of subdivision of the urPatches.

The view-projected patches in the queue can be analyzed in parallel. As indicated above, the system 100 may correspond to a parallel processing unit that has significant parallel computing applications, such as a GPU. Of course, the system 100 may correspond to some other processing unit that has multiple cores, wherein the multiple cores can be employed to perform parallel processing tasks. An analyzer component 104 can receive the view-projected patches and can determine whether to subdivide, cull, or render such view-projected patches. The analyzer component 104, for example, can output a decision for each patch (urPatch or sub-patch) in the form of storage requirements for such patch. For instance, the analyzer component 104 can output an indication that one memory slot is to be utilized for a patch that is to be rendered, can output an indication that zero memory slots are to be utilized for a patch that is to be culled, and can output an indication that four memory slots are to be utilized for a patch that is to be subdivided. Logic for ascertaining whether to cull, render or subdivide patches will be described in greater detail below.

Pursuant to an example, a parallel scan may be utilized after the analyzer component 104 has determined whether to cull, keep, or subdivide the various patches to compute prefix sums for a storage decision array (e.g., the slots output by the analyzer component 104). This can directly generate storage locations where the analyzer component 104 can cause the kept patches and subdivided patches to be retained. This process can be iterated until all remaining patches meet specified criteria (are subdivided until such patches are small enough, flat enough and single-sided, as will be described in greater detail below). A storage component 106 can be utilized to retain patches that are identified for rendering after each patch has been subdivided. For example, the storage component 106 can generate storage locations where subdivided patches or urPatches desirably rendered are retained in a memory 108 may be utilized to retain such patches (e.g., a queue).

More detail pertaining to ascertaining whether or not to cull, render, or subdivide patches will now be provided. The analyzer component 104 can include a cull tester component 110 that analyzes patches to ascertain whether such patches are entirely back-facing. Specifically, the cull tester component 110 can review substantially all surface normals of a patch to ascertain whether the patch is to be culled. The idea of back-patch culling is a higher order analog of back-face culling for triangles in a traditional rasterization pipeline. As indicated above, the cull tester component 110 analyzes a patch to ensure that all surface normals point away from the viewer, to guarantee that no patch will be culled from the queue in error.

Correct patch culling is not the only benefit derived from such a procedure. Unlike the two-state outcome of the triangle back-face test (front-facing or back-facing), a back-patch test undertaken by the cull tester component 110 has a third possible outcome. If some normals point to the viewer and some point away, since polynomials are continuous the patch projection must fold over onto itself, meaning that it contains a silhouette. Otherwise, no two distinct uv domain points can project onto the same screen space point. This means that they are bijective, and the derived micropolygon grids are well behaved. That is, the micropolygon grids cannot contain overlapping or concave quads.

In a view-projected space (clip-space), the correct back patch test may become a sign test on coefficients of the z-component of the parametric tangent plane; that is, the tangent plane at each point of the patch P(u, v). This can be computed as the four-dimensional cross product of P(u, v), $$\frac{\partial}{\partial u} P(u, v),$$

and $$\frac{\partial}{\partial v} P(u, v).$$

While this sum of products of polynomials appears to result in a bidegree eight polynomial, the actual result is only bidegree seven polynomial.

In an example, the cull tester component 110 can compute z components of the parametric tangent plane in Bézier form, which results in a scalar valued 8×8 control map when loading the three-dimensional model. The cull tester component 110 can count positive and negative entries within the resulting 8×8 array, using a parallel reduction in shared memory, for example. A positive count of 64 means the patch is entirely back-facing, and the cull tester component 110 can indicate that the patch is to be culled. A negative count of 64 means front-facing; and a nonzero positive and negative count means the patch includes a silhouette, in which case the patches can be kept for subdivision or rendering.

The analyzer component 104 may further include a comparer component 112 that can compare parameters of patches to ascertain whether a patch is desirably subdivided. For instance, the comparer component 112 can receive a view projected patch and may compare size of such patch with a predetermined threshold size. In an example, a screen space may be subdivided into tiles of a certain number of pixels, such as 8×8 pixel tiles. The comparer component 112 can analyze a view-projected patch and compare size of such view-projected patch with the threshold size which may correspond to size of a tile. Thus, the comparer component 112 can ensure that a view-projected patch can be less than or equal to an 8×8 pixel space.

The comparer component 112 can further analyze a view-projected patch to ensure that the patch is sufficiently flat. For example, projected screen space control points may desirably deviate from a bilinear interpolated patch corners by no more than a predefined tolerance. If the projected screen space control points of a view-projected surface patch deviate from the bilinear interpolated patch corners by more than the predetermined tolerance, then the view-projected patch can be marked for subdivision.

Furthermore, the comparer component 112 can analyze a view-projected patch to ascertain whether or not the patch includes a silhouette edge. If the patch does include a silhouette edge, the comparer component 104 can mark the view-projected patch for subdivision. Looking for silhouette edges can simplify crack hiding and sampling, and allows for true back-patch culling as described above. It can be noted that subdividing a patch with a silhouette edge typically generates at least one subpatch that still includes a silhouette. The criteria for silhouette edges can be removed if the patch is smaller than some predefined metric. Therefore, in summary, if a patch is too large, not flat enough, or includes a silhouette edge, the comparer component 112 can mark such patch for subdivision.

The system 100 further includes a subdivider component 114 that subdivides patches that are marked for subdivision. Conventionally, control points of subpatches are stored in the patch queue in the memory 108. This may require considerable storage (e.g., 256 bytes per rational bicubic Bézier patch), and thus limits a number of patches that can be managed. Additionally, loading control points into kernels of a parallel processing unit consumes memory bandwidth, potentially harming performance. Therefore, in the system 100 the subdivider component 114 can be configured to subdivide patches in the parameter domain of each urPatch. Accordingly, the urPatches can be stored in a separate buffer, and the subdivider component 114 can subdivide the urPatches and other subpatches in the parameter domain using quadtree coordinates. In other words, the subdivider component 114 can subdivide patches such that the actual control points of subdivided patches can be computed on the fly when they are needed instead of stored. A subdivided patch, or subpatch, can be represented with the following data structure:

```
struct QuadTreeCoord {
    unsigned int urPatchIDX;
    float u;
    float v;
    float length;
};
```

In this data structure, urPatchIDX is the index of the urPatch to which the subpatch belongs. u and v are the two-dimensional coordinates of the lower left corner of the sub-domain, and length represents the side length of the subdomain. A subpatch can be reconstituted when needed, for instance, using four different trim operations. In an example, each of the trim operations can evaluate 16 one-dimensional DeCasteljau steps in parallel to trim a boundary of the urPatch until the final subpatch is obtained (four components by four rows/columns). It can be noted that intermediate values can be stored in registers, and the transformed urPatch can be accessed using the texture cache and reconstitution runs at full SIMD efficiency, reconstituting two patches per CUDA warp. The first two trim operations are shown below.

```
{
float b0, b1, b2, b3;
{//subdivide left; threadIdx.x/y are [0..3] for a total of 16 threads
    int rowStart = urPatchIDX*64 + threadIdx.y * 16 + threadIdx.x;
    b0=tex1Dfetch(urPatchTexRef, rowStart + 0*4); //first cp.[0..3]
    b1=tex1Dfetch(urPatchTexRef, rowStart + 1*4); //second cp.[0..3]
```

-continued

```
        b2=tex1Dfetch(urPatchTexRef, rowStart +2*4); //third cp.[0..3]
        b3=tex1Dfetch(urPatchTexRef, rowStart + 3*4); //fourth cp.[0..3]
        float u1=u; float iul = 1.0f-ul
        float b01 = iul * b0 + ul * b1;
        float b12 = iul * b1 + ul * b2;
        float b23 = iul * b2 + ul * b3;
        float b0112 = iul * b01 + ul * b12;
        float b1223 = iul * b12 + ul * b23;
        float bm = iul * b0112 + ul *b1223;
        b0 = bm;
        b1 = b1223;
        b2 = b23
//      b3 = b3;
    }
    {//subdivide right
        float ur = level/(1.0f-u); float iur = 1.0f - ur;
        float b01 = iur * b0 + ur * b1;
        float b12 = iur * b1 + ur * b2;
        float b23 = iur * b2 + ur * b3;
        float b0112 = iur * b01 + ur * b12;
        float b1223 = iur * b12 + ur * b23;
        float bm = iur * b0112 + ur * b1223
        // *17 to avoid bank conflicts for the top-bottom subdivision
        int rowStart = patchAddrSM + threadIdx.y * 17 + threadIdx.x;
        cpsSub[rowStart + 0*4] = b0;
        cpsSub[rowStart + 1*4] = b01;
        cpsSub[rowStart + 2*4] = b0112;
        cpsSub[rowStart + 3*4] = bm;
        }
}
```

In summary, the system 100 receives urPatches that when conjoined are representative of a three-dimensional model, and projects such patches onto a scene to create view-projected patches. Thereafter, these view-projected patches are placed in a separate buffer in a queue and are analyzed to determine whether such patches should be culled (entirely back-facing), rendered, or subdivided. Specifically, the patches can be analyzed to determine that they are sufficiently small, sufficiently flat, and do not include silhouettes. If the patches are not sufficiently small, sufficiently flat, or include silhouettes, they can be marked for subdivision. Subdivision of the patches can be undertaken in the parameter domain and stored using quadtree coordinates. Such quadtree coordinates can be placed back in the queue for analysis whether the subpatches are desirably culled, rendered, or further subdivided. When this analysis is made, the subpatches can be reconstituted as described above.

Figure 2:
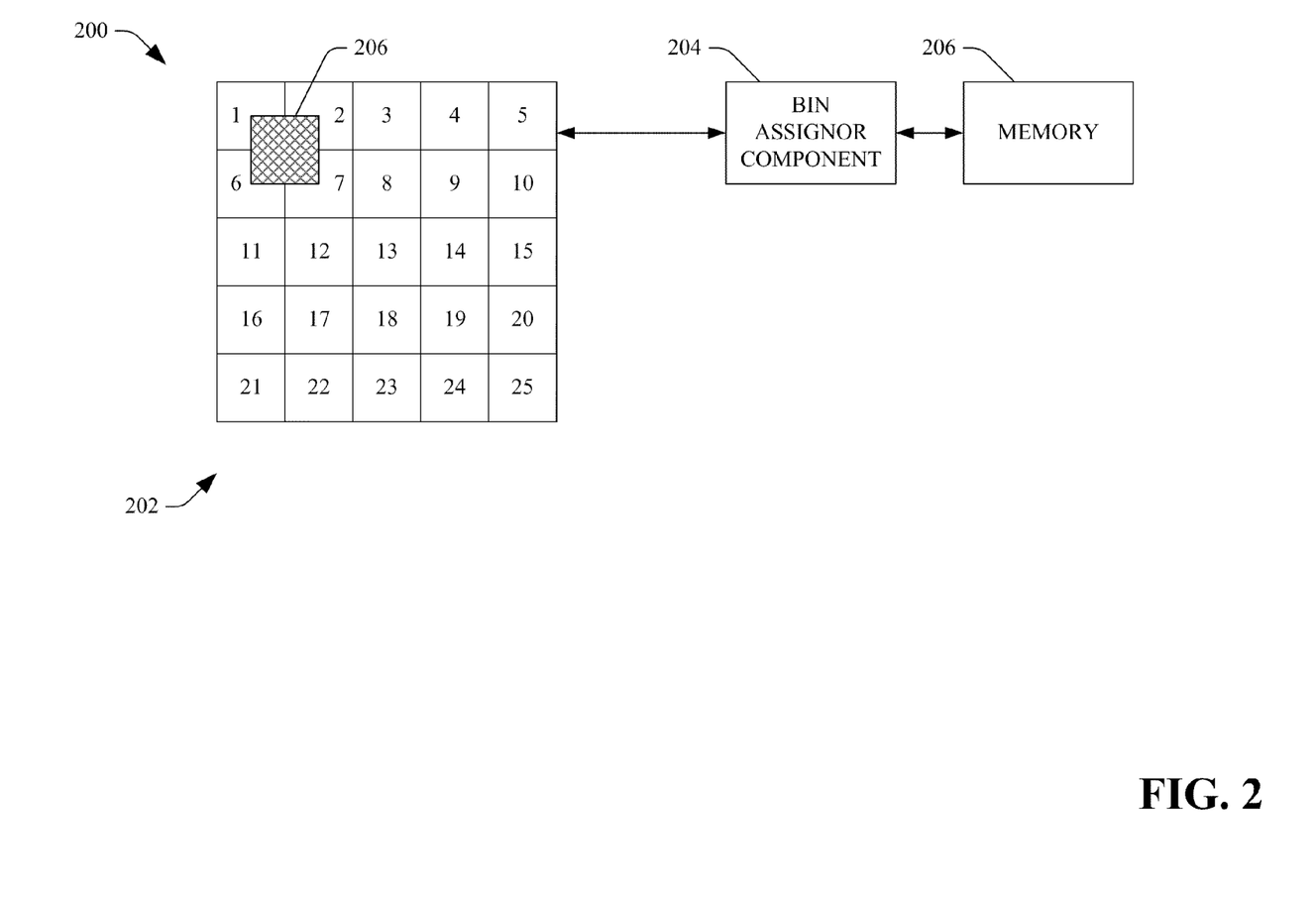
FIG. 2 is a functional block diagram of an example system that facilitates sorting of parametric surface patches into bins corresponding to screen tiles.

Referring now to FIG. 2, an example depiction of a system 200 that facilitates assigning patches/subpatches to one or more buckets is illustrated. As described above, a display screen 202 can be partitioned into a plurality of tiles. In the example depicted in FIG. 2, the display screen 202 is partitioned into 25 tiles, wherein each tile can be a certain number of pixels high by a certain number of pixels wide. Furthermore, as indicated above, each patch may be smaller than the size of the tile. Additionally, buckets can be defined, wherein a bucket corresponds to a tile. Thus, a first tile corresponds to a first bucket. A bucket assignor component 204 can assign a patch to a certain bucket or buckets, depending upon which tiles a patch lies within. This can be undertaken for each patch in the queue. In the example shown in FIG. 2, a patch 206, when projected onto a scene that is desirably displayed via the display screen 202 falls in tiles 1, 2, 6 and 7. The bucket assignor component 204 may thus assign the patch 206 to buckets 1, 2, 6 and 7, and such assignation can be stored in a memory 206.

Figure 3:
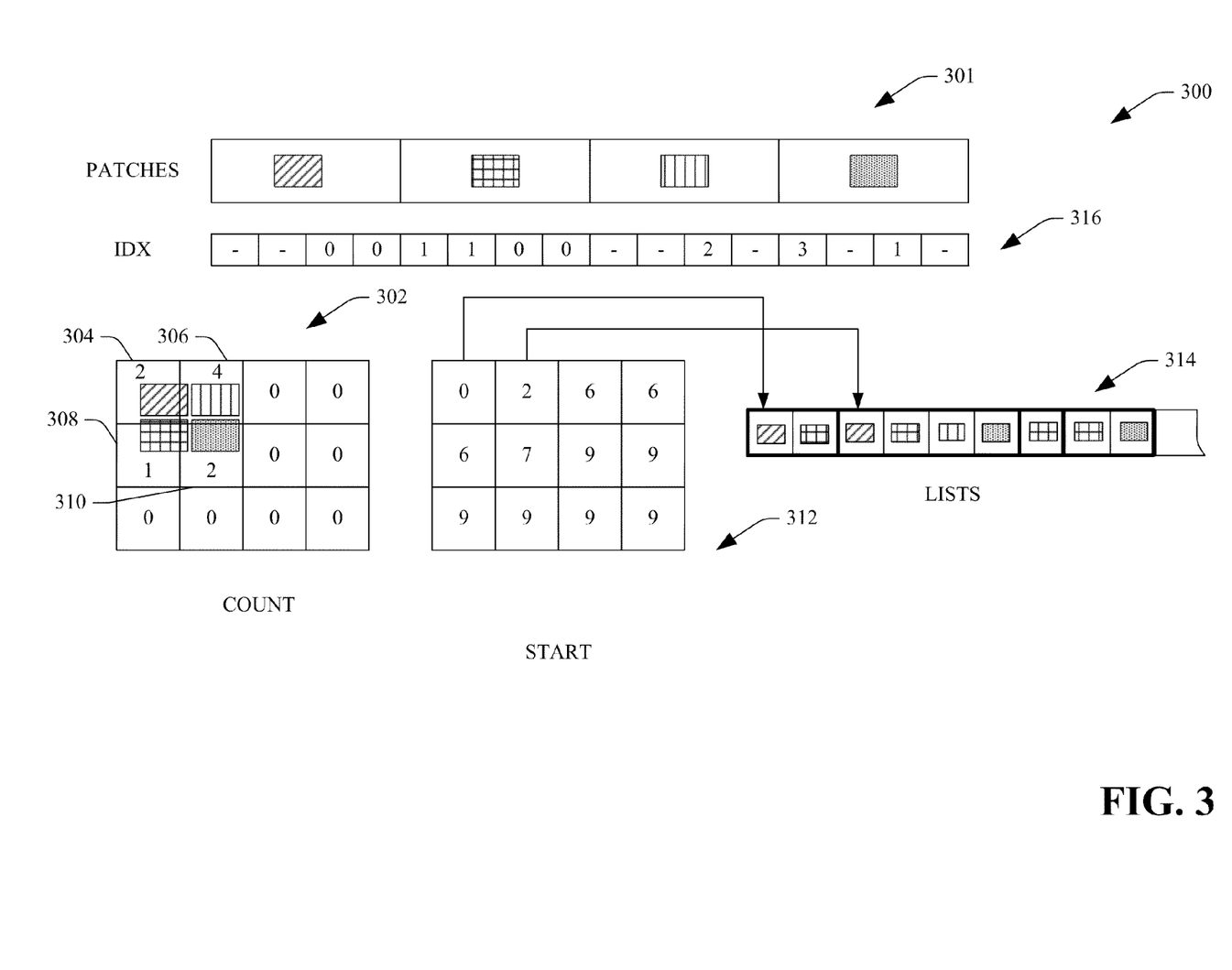
FIG. 3 is an example depiction of sorting parametric surface patches into bins corresponding to screen tiles.

Now referring to FIG. 3, an example depiction 300 of assignation of patches to buckets is illustrated. The depiction 300 includes a patch queue 301, which comprises plurality of patches that are desirably sorted into buckets. As can be ascertained, a variable-sized list of covering patches for each bucket can be generated. To facilitate this sorting of buckets and generation of variably sized lists of coverage patches for each bucket, lists can be organized as shown in FIG. 3. A COUNT list 302 stores length of the list of each bucket. Therefore, as shown in the COUNT list 302, two patches lie within bucket number one 304; four patches lie within bucket number two 306; one patch lies within bucket number three 308; and two patches lie within bucket number four 310. A START list 312 includes the start indices of the lists, and a LIST list 314 comprises the actual lists of patches. These lists can be generated through utilization of the algorithm described below.

First, a temporary buffer IDX 316 with space for four integers per patch can be allocated in the patch queue 301. Again, it can be noted that each patch covers at most four adjacent tiles. Additionally, the entries of the COUNT list 302 can be initialized to zero. Thereafter, addresses can be calculated. For instance, the atomic add function of CUDA can be utilized to calculate the addresses. Specifically, for each patch, an
atomicAdd(&COUNT[tileID$_{0...3}$], 1)
can be performed on the tiles the patch overlaps. This can be utilized to count the number of patches that will be stored in each bucket correctly, despite the possibility of multiple threads accessing the same bucket simultaneously. The values returned by the call are the indices in the patch list of the buckets, and these can be stored in IDX 316. Starting from the lower left corner, the indices for the top left, top right, top bottom, and bottom right buckets can be stored, or −1 for not covering a bucket.

Thereafter, patches can be sorted into buckets. In more detail, after the addresses are calculated, the START list 312 can be computed as the prefix sum of the COUNT list 302, using a parallel scan. Combining the START list 312 and IDX 316, the patches can be sorted into buckets. For each patch in the patch queue, the index can be stored at LISTS[START [tileID$_{0...3}$]+IDX$_{0...3}$].

Accessing the COUNT list 302 and START list 312, it can be ascertained for each tile how many and which patches will be needed to rasterize from the LISTS list 314. Using thread pooling, a switch can be made between per-patch parallelism during the grid setup and shading, and per-pixel parallelism during sampling. In an example, one CUDA thread block can be launched per tile. One lightweight thread can be allocated per pixel, and the CUDA scheduler can handle the load balancing.

With respect to dicing, for each subpatch a 4×4 grid of surface points can be evaluated. This 4×4 grid puts grid points in a one-to-one correspondence with control points, allowing grids to be computed efficiently and with a relatively small number of registers, using a modified form of the reconstitution algorithm described above. This modification is based on the relationship between control points and samples in the curve case. By evaluating the cubic Bernstein basis function at parameter value 0, $\frac{1}{3}$, $\frac{2}{3}$ and 1, it can be ascertained that samples on the curve are related to the control points by the following algorithm:

$$\begin{bmatrix} a_0 \\ a_1 \\ a_2 \\ a_3 \end{bmatrix} = \frac{1}{27} \begin{bmatrix} 27 & 0 & 0 & 0 \\ 8 & 12 & 6 & 1 \\ 1 & 6 & 12 & 8 \\ 0 & 0 & 0 & 27 \end{bmatrix} \cdot \begin{bmatrix} b_0 \\ b_1 \\ b_2 \\ b_3 \end{bmatrix}. \quad (1)$$

At the end of each one-dimensional DeCasteljau step, the Bézier points can be replaced with curve points utilizing Equation (1). Due to the separability of the tensor product surfaces, this can result in a 4×4 grid of surface samples.

Figure 4:
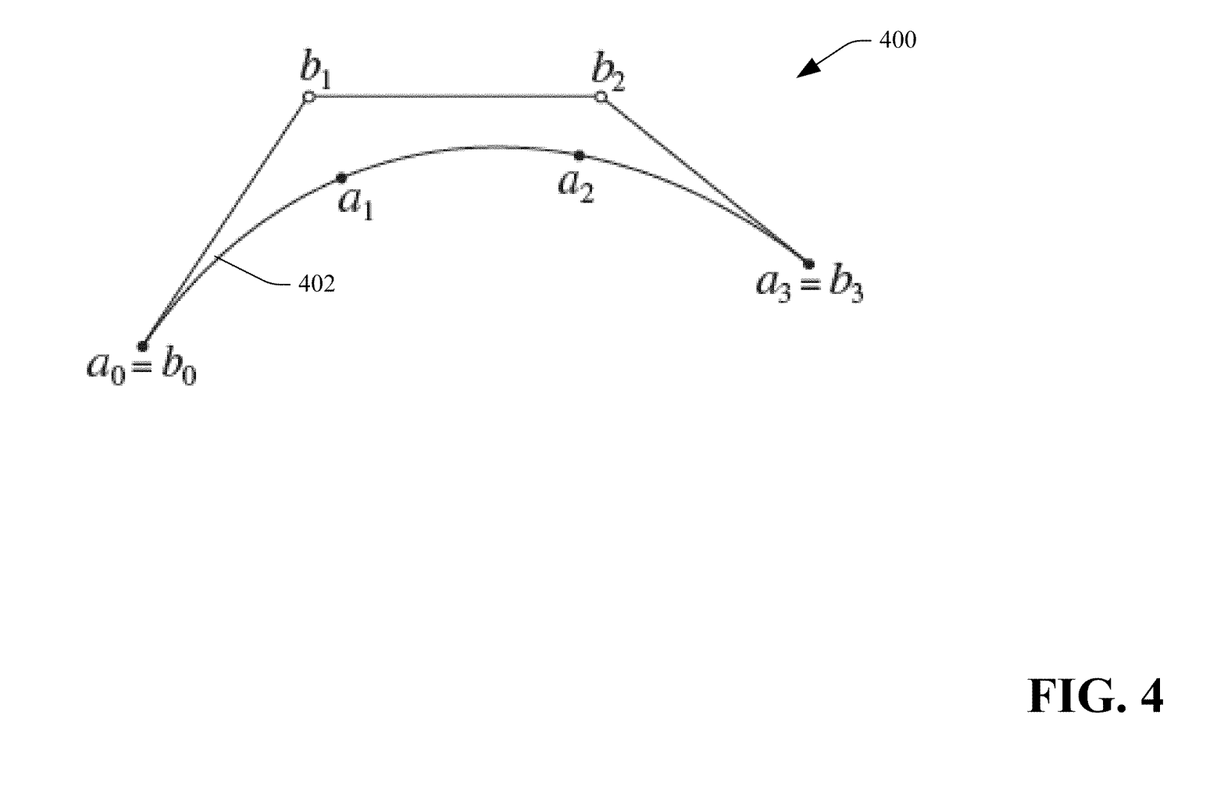
FIG. 4 is an example cubic Bézier curve.

With reference now to FIG. 4, a diagram 400 that illustrates a correspondence between control points and samples with respect to a Bézier curve is illustrated. Specifically, a cubic Bézier curve 402 with control points $b_i$ and corresponding points on the curve 402 $a_i$ is illustrated. As indicated above, the samples $a_i$ on the Bézier curve are related to the control points $b_i$ through Equation (1).

Grid shading will now be described. The resulting micropolygon can be flat-shaded, using an estimated surface normal for each quad. Conceptually, the plane that comprises the centroid of the quad can be located and the difference of the diagonal vertices can be ascertained using the four-dimensional cross product. In practice, however, this requires more data pertaining to vertices than are necessary to get a convincing result. Thus, instead, the homogeneous division can be performed, the three-dimensional cross product can be taken of the diagonal vectors, and the plane containing the centroid can be solved for, and back projection can be undertaken using the sparse perspective matrix. If the quad comprises a degenerate edge, this will yield the tangent plane of the corresponding triangle and produce a valid normal.

Flat shading may be more stable and require considerably fewer registers than shading at vertex positions and using Gouraud or Phong interpolation, especially when degenerated patches are encountered. It is to be understood that interpolation could be used instead of flat shading. However, Phong shading would require some sort of scoreboarding to archive reasonable SIMD efficiency with tiny triangles. After shading, grid points can be adjusted to hide cracks.

Figure 5:
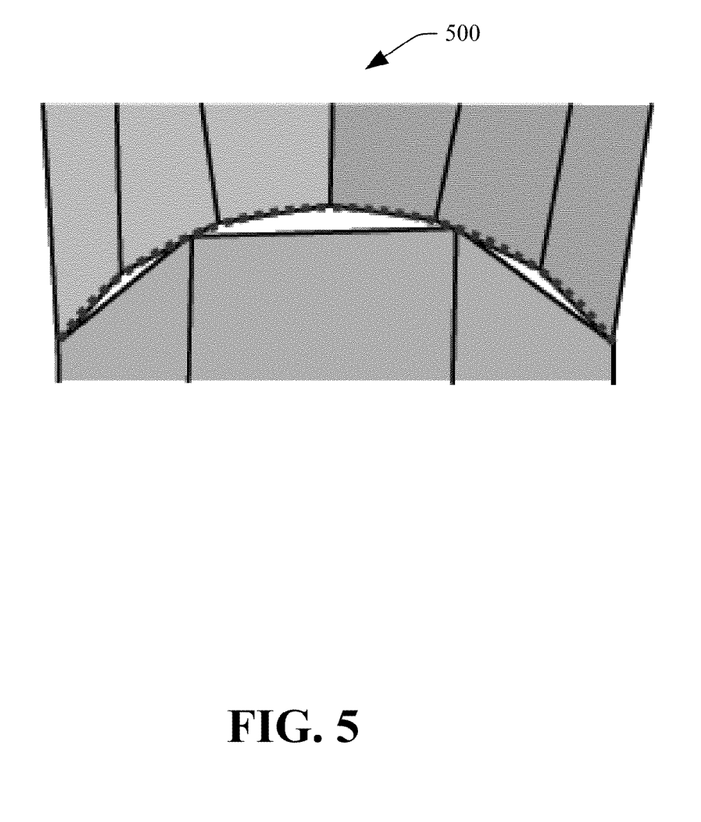
FIG. 5 is an example depiction of cracks between adjacent parametric surface patches.
Figure 6:
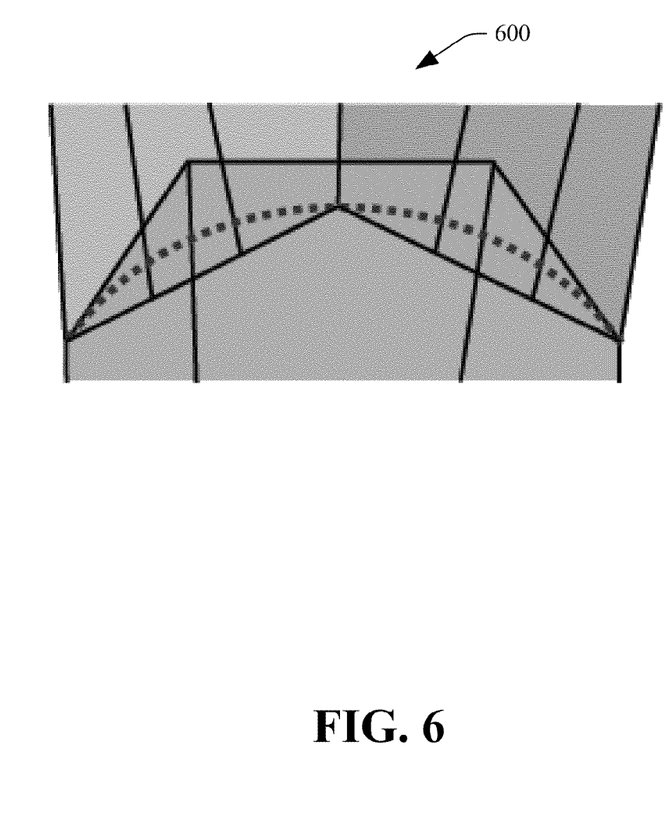
FIG. 6 illustrates an example depiction of a technique that can be utilized to hide cracks between adjacent parametric surface patches.

In more detail, the adaptive subdivision described above can produce cracks, and it is desirable to hide such cracks. One approach to hiding the cracks is to extend the grid to the Bézier convex hull of the patch. Referring to FIG. 5, a depiction 500 of conjoining parametric view patches with cracks between such patches is shown. Referring to FIG. 6, a graphical depiction 600 of hiding such cracks through extension of the grids to the Bézier convex hull of the patch is shown. This guarantees that all sample points covered by the parametric surface will be set. Of course this can create overlap, and samples not covered by the parametric surface might be set at silhouettes. The bias introduced is bounded by the flatness metric, so the convex hull cannot deviate from the real surface very much. A one pixel threshold may be used, for example. Also, it can be noted that this manipulation of the grid vertices does not introduce shading errors, as the grid has been shaded prior to adjusting vertices.

As described above, the subpatches that are bucketed are either smaller than the flatness threshold, generally less than one pixel, or do not include silhouettes. This means at the subpatches are bijective, and have well behaved grids. Hence the Bézier convex hull is completely determined by the four boundary curves. For a 4×4 grid, it may be sufficient to adjust a few interior points on the boundary curves to make the footprint convex.

Figures 7, 8:
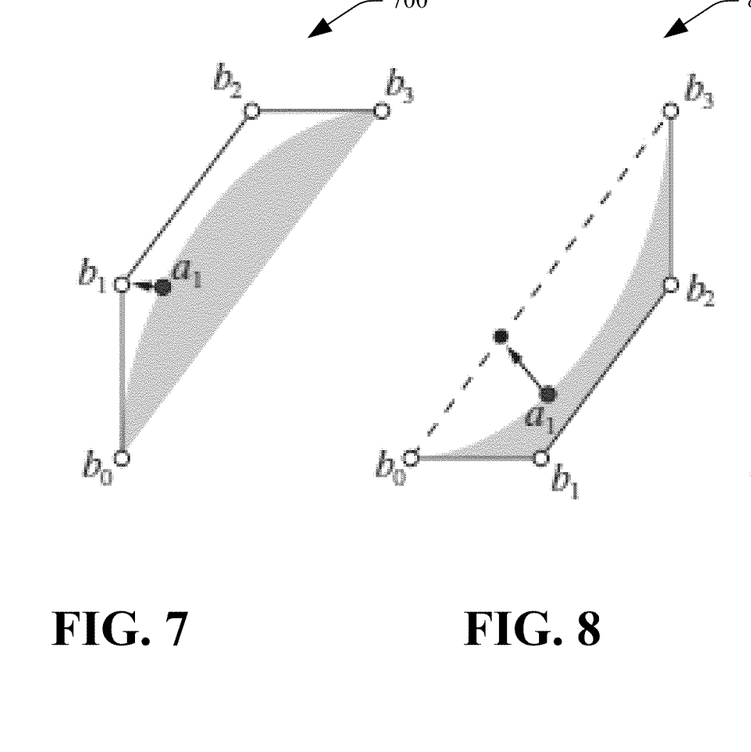
FIGS. 7-9 illustrate three possible configurations that can be utilized to hide cracks between parametric surface patches.
Figure 9:
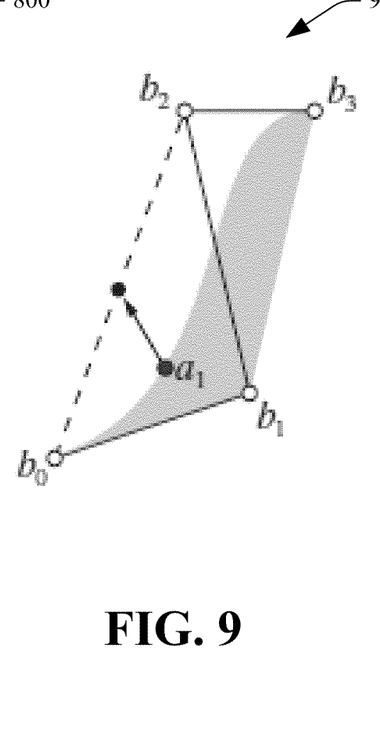

With reference to FIGS. 7, 8 and 9, three possible configurations for such an interior point $a_1$ are illustrated. Referring simultaneously to FIGS. 7 through 9, it first can be determined where the Bézier control point $b_1$ is located relative to the boundary edge defined by $b_0$ and $b_3$ by reviewing the signed area of the triangle $b_0$, $b_3$, $b_1$. If its determinant is negative, then $b_1$ is outside (FIG. 7) and the interior grid point can be moved to $b_1$. Otherwise, the new position can be interpolated depending upon a position of $b_2$. If $b_2$ is inside the boundary edge (determined by the signed area of the triangle $b_0$, $b_3$, $b_2$ as shown in FIG. 8), $a_1$ can be interpolated as $$\frac{2}{3}b_0 + \frac{1}{3}b_3.$$

Otherwise, $a_1$ can be interpolated as $$\frac{1}{2}b_0 + \frac{1}{2}b_2$$

(FIG. 9). It can be noted that Bézier control points of the boundary printers can be recovered from the previously created grid by inverting Equation (1) to conserve shared memory and registers.

Due to the overlapping of convex hulls, pixel samples in the overlap region can count two hits corresponding to the same surface layer. For opaque surfaces without layering, the z-buffer test resolves the issue without noticeable artifacts. In case multiple layers are needed, hits can be merged to obtain the correct layering. This can be done with a fuzzy z-test. If the difference between the new z value and the existing z buffer value is less than a tolerance and the subpatches have the same urPatchIDX, they are considered to belong to the same layer.

Once the grid boundaries have been adjusted to hide cracks, per-pixel parallelism can be undertaken for coverage testing. For instance, one thread may be responsible for all subsamples of its pixel. A precomputed two-dimensional Halton sequence can be used for the subsample equations, and to test whether such subsample equations are inside the four half spaces defined by the four polygon edges. The four dot products can be computed and signs thereof can be tested. If all four values are positive, the pixel sample is covered. There is no need to consider nonconvex quads, since the back-patch testing described above guarantees that grids cannot contain nonconvex quads.

For covered samples, the z value can be interpolated from the quad vertices, and a z test can be performed and the quad color can be stored if necessary. For effects that require sorted layers, a bubble sort with fuzzy z test can be used to insert the sample. Due to similar memory access patterns for neighboring threads, it performs rather well for the number of layers typically used. Finally, whatever logic that is needed can be employed on the layers to obtain a desired effect, the subsamples can be averaged, and the final pixel color can be written to the frame buffer. Sampling can suffer the most from a limited amount of shared memory with respect to graphical processing units. Each thread has to compute edge equations separately from the grid vertices. To avoid unnecessary coverage tests, a few simple bounding box tests can be utilized. For the edge equations that are used for the subsamples, the registers holding the edge equations cannot be used for the z or color buffer entries, further harming performance.

Figure 10:
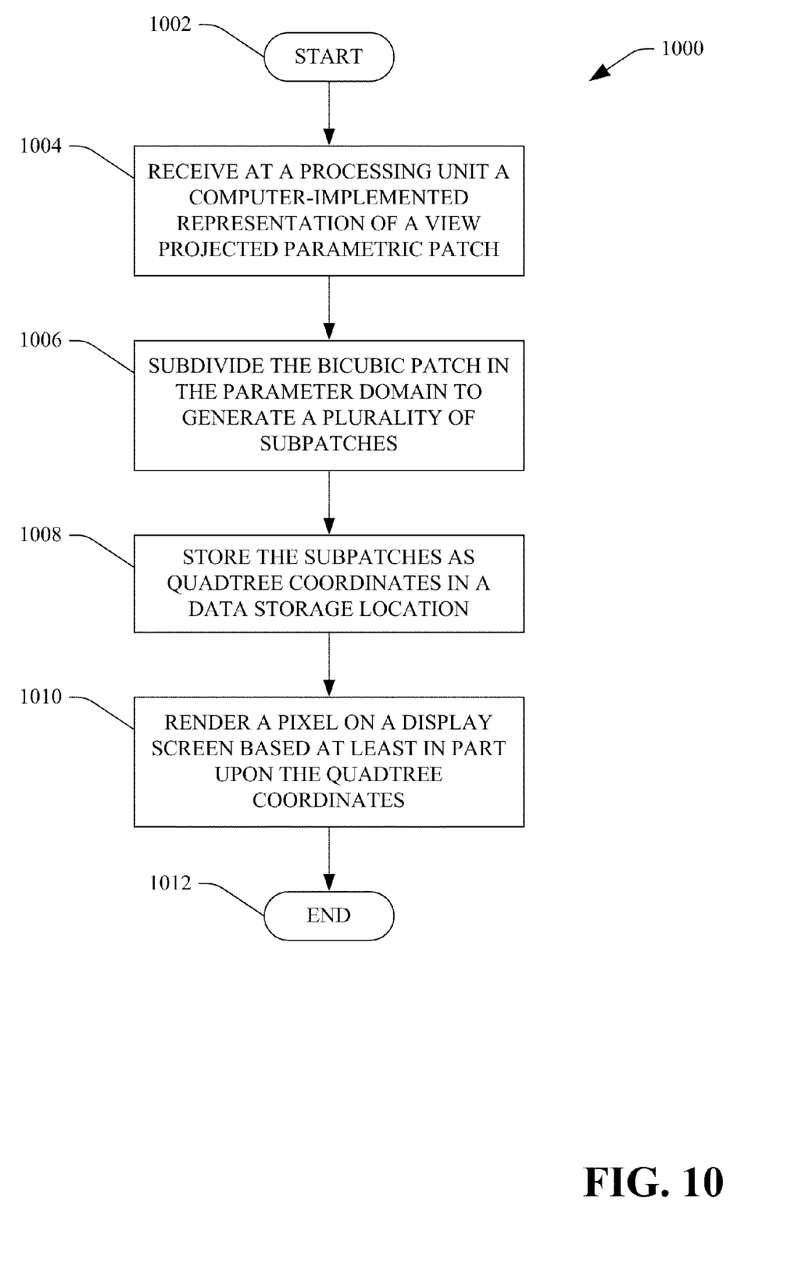
FIG. 10 is a flow diagram that illustrates an example methodology for rendering a tile on a display screen based at least in part upon quadtree coordinates corresponding to a subdivision of a parametric surface patch.
Figure 11:
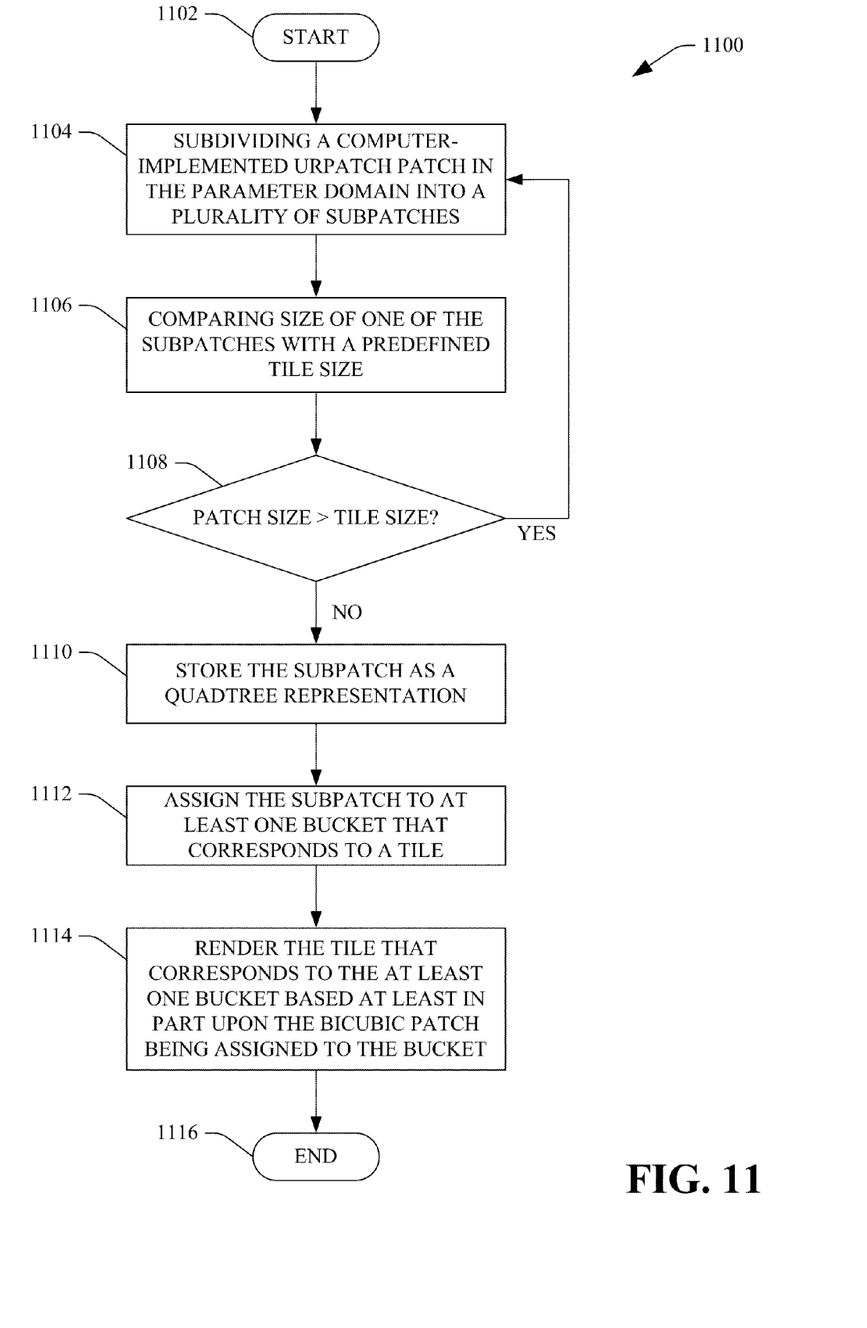
FIG. 11 is a flow diagram that illustrates an example methodology for rendering a tile on a display screen of a computing device based at least in part upon a bucket to which a parametric surface patch is assigned.

With reference now to FIGS. 10 and 11, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. Still further, a computing device, such as a GPU, can be configured to perform the acts of the methodologies described herein.

Referring now to FIG. 10, a methodology 1000 that facilitates rendering a three-dimensional model on a display screen is illustrated. The methodology 1000 begins at 1002, and at 1004 a computer-implemented representation of a view-projected parametric patch is received at a processing unit, such as a graphical processing unit. The view-projected parametric patch may be a portion of a three-dimensional model that is desirably displayed at a first viewing perspective on the aforementioned display screen.

At 1006, the view-projected parametric patch is subdivided in the parameter domain to generate a plurality of sub-patches. For example, if the received view-projected parametric patch has a domain from 0 to 1 in a u direction and 0 to 1 in a v direction, then a domain of one of the sub-patches will be 0-½ in the u direction and 0-½ in the v direction.

At 1008, the subpatches are stored as quadtree coordinates in a data storage location. For instance, as described above, the quadtree coordinates may be stored in a patch queue, and subpatches can be reconstituted when needed through utilization of the quadtree coordinates. Pursuant to an example, the quadtree coordinates may include an indication of a urPatch corresponding to the sub-patch, an indication of a corner of a domain, and a length of the domain in each direction.

At 1010, at least one pixel is rendered on the display screen based at least in part upon the quadtree coordinates. For example, the quadtree coordinates can be accessed and a patch can be reconstituted, binned, cracks can be hid, and thereafter the patch can be rendered on the display screen. The methodology 1000 completes at 1012.

Referring now to FIG. 11, an example methodology 1100 that facilitates rendering a tile on a display screen is illustrated. The methodology 1100 starts at 1102, and at 1104 a computer-implemented urPatch is subdivided in the parameter domain into a plurality of different subpatches (four different subpatches). The bicubic patch may be included in a three-dimensional model that is desirably displayed on the display screen at a particular view perspective.

At 1106, size of one of the subpatches is compared with a predefined tile size (8 by 8 pixels). At 1108, a determination is made regarding whether the size of the subpatch is greater than the tile size. If the size of the subpatch is greater than the tile size, then the methodology returns to 1104 and such subpatch is subdivided. If the subpatch size is less than the tile size (and the subpatch is sufficiently flat and does not include silhouettes) then the subpatch can be stored as quadtree coordinates in a patch queue at 1110.

At 1112, the subpatch is assigned to at least one bucket that corresponds to a tile. At most the subpatch may be assigned to four different buckets. At 1114, the tile that corresponds to the at least one bucket is rendered, based at least in part upon the subpatch being assigned to such bucket. The methodology 1100 completes at 1116.

Figure 12:
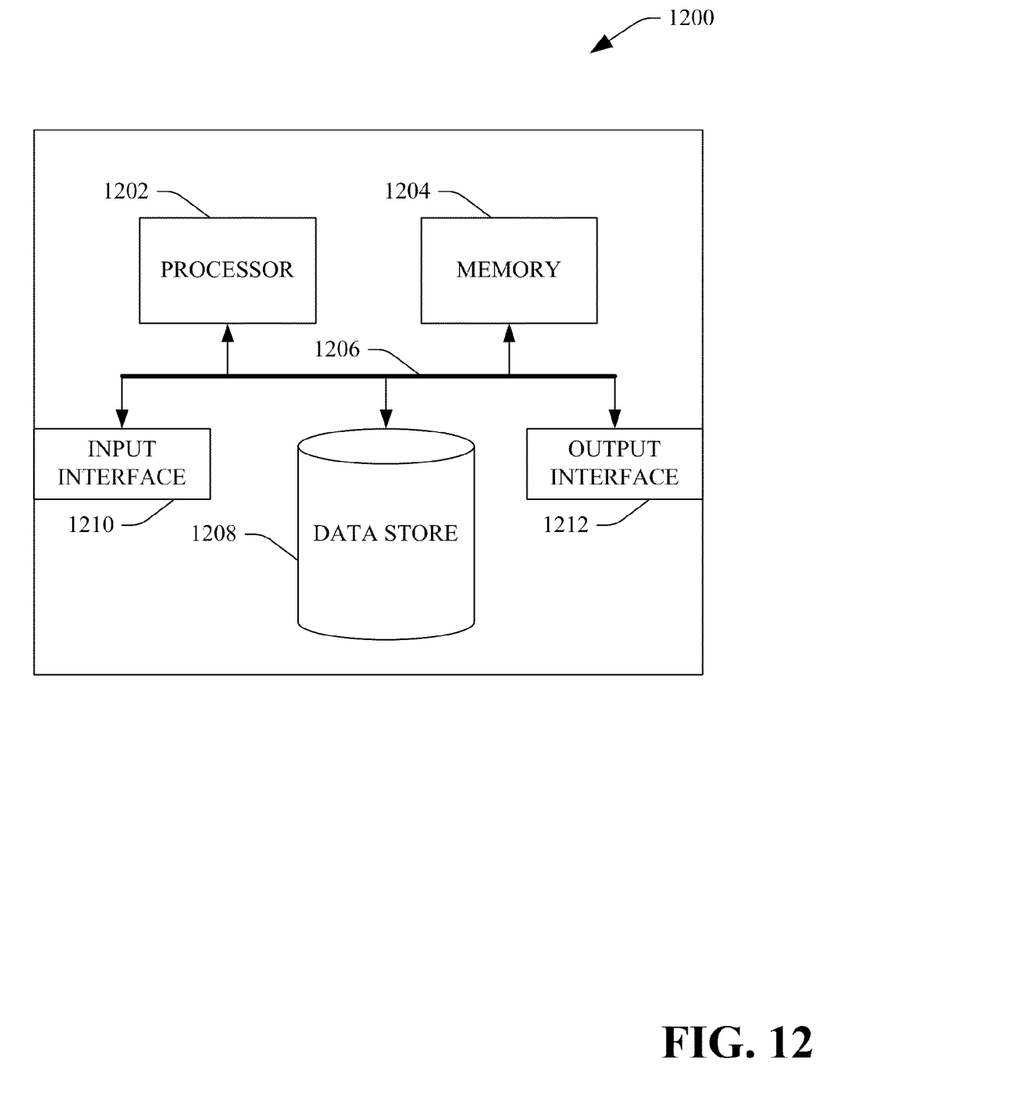
FIG. 12 is an example computing system.

Now referring to FIG. 12, a high-level illustration of an example computing device 1200 that can be used in accordance with the systems and methodologies disclosed herein is illustrated. For instance, the computing device 1200 may be used in a system that supports rendering graphics on a display screen. In another example, at least a portion of the computing device 1200 may be used in a system that comprises a graphical processing unit. The computing device 1200 includes at least one processor 1202 that executes instructions that are stored in a memory 1204. In an example, the processor 1202 may be a GPU, and the instructions may be, for instance, instructions for implementing functionality described as being carried out by one or more components discussed above or instructions for implementing one or more of the methods described above. The processor 1202 may access the memory 1204 by way of a bus 1206. In addition to storing executable instructions, the memory 1204 may also store quadtree coordinates that represent subpatches, lists indicating which bucket has been assigned to which patches, etc.

The computing device 1200 may additionally include a data store 1208 that is accessible by the processor 1202 by way of the bus 1206. The data store 1208 may include executable instructions, three-dimensional models for rendering, etc. The computing device 1200 also includes an input interface 1210 that allows external devices to communicate with the computing device 1200. For instance, the input interface 1210 may be used to receive instructions from an external computer device, from a motherboard, etc. The computing device 1200 also includes an output interface 1212 that interfaces the computing device 1200 with one or more external devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component may be a particular portion of memory that has instructions retained thereon or a series of transistors configured to execute a particular computing process.

Furthermore, as used herein, "computer-readable medium" is intended to refer to a non-transitory medium, such as memory, including RAM, ROM, EEPROM, Flash memory, a hard drive, a disk such as a DVD, CD, or other suitable disk, etc.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method performed by a computer system for rendering parametric surface patches on a display screen, the method comprising:

receiving, at a parallel processing unit, a computer-implemented representation of a first parametric surface patch, wherein the first parametric surface patch is a portion of a three-dimensional computer-implemented model that is desirably displayed at a first viewing perspective on the display screen;

subdividing the first parametric surface patch in the parameter domain to generate a plurality of subpatches;

storing the plurality of subpatches as respective quadtree coordinates in a memory accessible by the processing unit, wherein first quadtree coordinates for a first subpatch in the plurality of subpatches include:

first data that indicates the first parametric surface patch from which the first subpatch is generated;

second data that indicates a portion of a sub-domain formed by the first subpatch; and third data that indicates a length of the sub-domain formed by the first subpatch; and rendering at least one pixel on the display screen based at least in part upon the first quadtree coordinates.

2. The method of claim 1, wherein the parallel processing unit is a graphical processing unit.

3. The method of claim 1 configured for execution in a gaming console.

4. The method of claim 1, wherein the first parametric surface patch is a Bézier patch.

5. The method of claim 1, further comprising:
comparing size of the first parametric surface patch with a threshold size; and
causing the parametric surface patch to be subdivided into the plurality of subpatches based at least in part upon the comparing the size of the parametric surface patch with the threshold size.

6. The method of claim 5, further comprising:
partitioning the display screen into a plurality of tiles of a particular size; and
defining the threshold size to correspond to the particular size.

7. The method of claim 1, further comprising:
comparing projected screen space control points of the first parametric surface patch with bilinear interpolated corners of the first parametric surface patch to generate a deviation;
comparing the deviation with a threshold deviation; and
causing the first parametric surface patch to be subdivided into the plurality of subpatches based at least in part upon the comparing of the deviation with the threshold deviation.

8. The method of claim 1, further comprising:
determining that the first parametric surface patch comprises a silhouette edge; and
causing the first parametric surface patch to be subdivided into the plurality of subpatches based at least in part upon the determining that the first parametric surface patch comprises the silhouette edge.

9. The method of claim 1, further comprising:
computing direction of surface normals of at least one of the plurality of subpatches; and
culling the at least one of the plurality of subpatches from the queue based at least in part upon the direction of the surface normals of the at least one of the plurality of subpatches.

10. The method of claim 1, further comprising:
partitioning the display screen into a plurality of tiles;
defining buckets that correspond to the plurality of tiles; and
assigning at least one of the plurality of subpatches to a bucket based at least in part upon identities of tiles that the at least one subpatch overlaps on the display screen.

11. The method of claim 10, wherein each tile is eight pixels by eight pixels.

12. The method of claim 1, further comprising hiding cracks on the display screen caused by adaptive subdivision parametric surface patches.

13. The method of claim 12, wherein hiding cracks on the display screen of the computing device comprises extending grids of the first parametric surface patch to a Bézier convex hull of the first parametric surface patch.

14. A graphical processing unit comprising at least one processor core and configured with instructions that cause the graphical processing unit to perform acts comprising:

receiving a computer-implemented parametric surface patch, wherein the parametric surface patch is a portion of a three-dimensional model that is desirably displayed on a display screen that is in communication with the graphical processing unit;

recursively subdividing the parametric surface patch in a parameter domain of the parametric surface patch to generate a plurality subpatches;

storing the plurality of subpatches in a memory that is accessible to the graphical processing unit, wherein the plurality of subpatches are stored as quadtree coordinates in the memory wherein for each subpatch in the plurality of subpatches, respective quadtree coordinates for a respective subpatch includes:

first data that is representative of the first parametric surface patch from which the subpatch is generated;

second data that is representative of a corner of a respective sub-domain formed by the respective subpatch; and third data that is representative of a length of the respective sub-domain formed by the respective subpatch; and causing at least one pixel to be rendered on the display screen based at least in part upon the respective quadtree coordinates of the respective subpatch.

15. The graphical processing unit of claim 14, wherein the acts further comprise:
accessing the quadtree coordinates in the memory; and
reconstituting at least one subpatch based at least in part upon the accessed quadtree coordinates, wherein reconstituting the at least one subpatch comprises computing control points of the at least one subpatch based at least in part upon the quadtree coordinates.

16. The graphical processing unit of claim 15, wherein the acts further comprise reconstituting a plurality of subpatches in parallel.

17. The graphical processing unit of claim 14 comprised by a gaming console.

18. The graphical processing unit of claim 14, wherein the acts further comprise:
partitioning the display screen into a plurality of tiles, wherein a bucket corresponds to each tile;
assigning at least one of the subpatches to at least one bucket, wherein any single subpatch is assigned to at most four buckets.

19. The graphical processing unit of claim 14, wherein the acts further comprise modifying display of adjacent parametric surface patches on the display screen to hide cracks between the adjacent parametric surface patches.

20. A parallel processing unit comprising a plurality of processor cores and configured to execute the following acts:

a) subdividing a computer-implemented parametric surface patch in a parameter domain into four subpatches, wherein the parametric surface patch is included in a three-dimensional model that is desirably displayed on a display screen in communication with the graphical processing unit;

b) comparing size of a first subpatch from amongst the subpatches with a predefined tile size;

c) when the size of the first subpatch is larger than the predefined tile size, repeating act a) with the first subpatch being the parametric surface patch;

d) when the size of the first subpatch is smaller than the predefined tile size, causing the first subpatch to be stored as quadtree coordinates, wherein the quadtree coordinates include first data indicating the parametric surface patch from which the first subpatch is subdivided, second data indicating a portion of a sub-domain formed by the first subpatch, and third data indicating a length of the sub-domain formed by the first subpatch;

e) assigning the first subpatch to at least one bucket, wherein the at least one bucket corresponds to a tile; and f) rendering individual tiles to display the first subpatch on the display screen.

\* \* \* \* \*